(12) United States Patent
Imi et al.

(10) Patent No.: US 11,536,465 B2
(45) Date of Patent: Dec. 27, 2022

(54) HOT WATER SUPPLY DEVICE AND HOT WATER SUPPLY SYSTEM

(71) Applicant: NORITZ CORPORATION, Hyogo (JP)

(72) Inventors: Yasunori Imi, Kakogawa (JP); Takahiro Maeda, Hyogo (JP); Takeshi Sugie, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 0 days.

(21) Appl. No.: 17/286,822

(22) PCT Filed: Oct. 24, 2019

(86) PCT No.: PCT/JP2019/041800
§ 371 (c)(1),
(2) Date: Apr. 20, 2021

(87) PCT Pub. No.: WO2020/085465
PCT Pub. Date: Apr. 30, 2020

(65) Prior Publication Data
US 2021/0372633 A1    Dec. 2, 2021

(30) Foreign Application Priority Data
Oct. 25, 2018   (JP) .............................. JP2018-201262

(51) Int. Cl.
*F24D 19/10* (2006.01)
*F24H 9/20* (2022.01)
*H04W 84/18* (2009.01)

(52) U.S. Cl.
CPC ..... *F24D 19/1069* (2013.01); *F24D 19/1051* (2013.01); *F24H 9/2007* (2013.01); *H04W 84/18* (2013.01)

(58) Field of Classification Search
CPC ............ F24D 19/1069; F24D 19/1051; F24H 9/2007; H04W 84/18
See application file for complete search history.

(56) References Cited

U.S. PATENT DOCUMENTS 10,215,424 B2 * 2/2019 Acker ................ F24D 19/1063
10,345,772 B2 * 7/2019 Piaskowski ............ G05B 15/02
(Continued)

FOREIGN PATENT DOCUMENTS

JP  2000231481  8/2000
JP  2008167488  7/2008
(Continued)

OTHER PUBLICATIONS

"International Search Report (Form PCT/ISA/210) of PCT/JP2019/041800," dated Nov. 26, 2019, with English translation thereof, pp. 1-3.

*Primary Examiner* — Gregory A Wilson
(74) *Attorney, Agent, or Firm* — JCIPRNET

(57) ABSTRACT

A hot water supply device (10) is provided with: a first device (for example, a kitchen remote controller (13)) for performing control relating to hot water supply; a second device (for example, a water heater (11)) that is communicably connected to the first device and performs control relating to hot water supply; and a communication unit that is provided in the first device and can be connected to an external communication network. The first device divides data of control software of the second device acquired from an external device (for example, a server (50)) via the communication unit, into a plurality of parts, and transmits to the second device.

7 Claims, 7 Drawing Sheets

(56) References Cited

U.S. PATENT DOCUMENTS

| | | | |
|---|---|---|---|
| 10,642,289 B1* | 5/2020 | Reeder | G05D 23/1366 |
| 10,671,374 B2* | 6/2020 | Hirota | G06F 8/65 |
| 10,742,439 B2* | 8/2020 | Sugioka | F24D 3/08 |
| 2003/0210126 A1* | 11/2003 | Kanazawa | G08C 17/02 |
| | | | 340/5.5 |
| 2009/0103697 A1* | 4/2009 | Matsuoka | F24H 1/54 |
| | | | 379/102.01 |
| 2015/0294558 A1* | 10/2015 | Huang | G08C 17/02 |
| | | | 340/5.61 |
| 2019/0364614 A1* | 11/2019 | Maekawa | H04B 1/1027 |
| 2020/0103927 A1* | 4/2020 | Tawada | F24D 19/1069 |
| 2021/0149665 A1* | 5/2021 | Hashimoto | H04L 67/12 |
| 2021/0266391 A1* | 8/2021 | Kozai | F24H 9/0005 |

FOREIGN PATENT DOCUMENTS

| | | |
|---|---|---|
| JP | 2013137130 | 7/2013 |
| JP | 2017091365 | 5/2017 |
| JP | 2018006800 | 1/2018 |

* cited by examiner

HOT WATER SUPPLY DEVICE AND HOT WATER SUPPLY SYSTEM

CROSS-REFERENCE TO RELATED APPLICATION

This application is a 371 application of the International PCT application serial no. PCT/JP2019/041800, filed on Oct. 24, 2019, which claims the priority benefits of Japan Patent Application No. 2018-201262, filed on Oct. 25, 2018. The entirety of each of the above-mentioned patent applications is hereby incorporated by reference herein and made a part of this specification.

TECHNICAL FIELD

The present invention relates to a hot water supply device that can be connected to an external communication network, and a hot water supply system including the hot water supply device and an external device.

BACKGROUND ART

In hot water supply devices, settings of various types are made via a remote controller installed in a kitchen, bathroom, or the like. Also, in recent years, systems for remotely controlling a hot water supply device from outside a house using a mobile terminal device have also been proposed. In these hot water supply devices, control software such as firmware is installed in a control unit (microcomputer) of a water heater or a remote controller.

The following Patent Literature 1 describes a remote-control system that downloads control software used for remote control of a hot water supply device from a server to a remote controller. In this remote-control system, a remote controller installed in a kitchen can be connected to an external communication network via a router. The remote controller acquires the control software from the server via the external communication network and installs the control software on its own microcomputer.

CITATION LIST

Patent Literature

Patent Literature 1

Japanese Patent Laid-Open No. 2018-6800

SUMMARY OF INVENTION

Technical Problem

According to the configuration of Patent Literature 1, control software can be smoothly installed on the remote controller that can be connected to an external communication network. However, the microcomputer on which the control software is installed is not limited to a microcomputer of a remote controller installed in a kitchen, and using various microcomputers involved in control of a hot water supply device such as a microcomputer of a remote controller installed in a bathroom, a microcomputer of a water heater, and the like can be conceived.

In this case, a configuration in which control software for a microcomputer of another device is acquired via a remote controller that can be connected to an external communication network, and the acquired control software is transmitted from the remote controller to the other device may be used. However, in this configuration, normal communication in the hot water supply device is restricted during transmission of the control software, and this may cause problems in operation of the hot water supply device.

In view of such a problem, an objective of the present invention is to provide a hot water supply device and a hot water supply system capable of smoothly transmitting control software to each device constituting the hot water supply device while restriction on normal communication in the hot water supply device is curbed.

Solution to Problem

A first aspect of the present invention relates to a hot water supply device. The hot water supply device according to this aspect includes a first device performing control related to hot water supply, a second device connected to be able to communicate with the first device and performing control related to hot water supply, and a communication unit provided in the first device and able to be connected to an external communication network. Here, the first device divides data of control software of the second device acquired from an external device via the communication unit into a plurality of pieces and transmits the divided data to the second device.

According to the hot water supply device according to the present aspect, data of the control software of the second device is divided into a plurality of pieces and transmitted to the second device. Therefore, a period during which normal communication is restricted becomes shorter than when data of the control software is collectively transmitted. That is, the normal communication is restricted only in a period during which separate units of the data of the control software are transmitted. Therefore, the control software can be smoothly transmitted to the second device while restriction on normal communication in the hot water supply device is curbed.

In the hot water supply device according to the present aspect, the first device may be one of a water heater and a remote controller for remotely controlling the water heater, and the second device may be the other of the water heater and the remote controller.

According to this configuration, the control software can be smoothly transmitted from one of the water heater and the remote controller to the other thereof while restriction on normal communication in the hot water supply device is curbed.

In the hot water supply device according to the present aspect, the first device may be a remote controller for remotely controlling a water heater, and the second device may be another remote controller for remotely controlling the water heater.

According to this configuration, the control software can be smoothly transmitted from the remote controller on one side to the remote controller on the other side while restriction on normal communication in the hot water supply device is curbed.

In the hot water supply device according to the present aspect, the first device may be configured to divide the data of the control software so that a transmission time of a separate unit of the data of the control software is shorter than one cycle of regular communication performed between the water heater and the remote controller connected to the water heater.

According to this configuration, the control software can be smoothly transmitted from the first device to the second device without hindering the regular communication.

In this configuration, the first device may be configured to divide the data of the control software so that the separate unit of the data of the control software is able to be transmitted a plurality of times in one cycle of the regular communication.

According to this configuration, a period during which normal communication other than the regular communication is restricted can be reduced. That is, normal communication other than the regular communication is only restricted in each communication period of the data of the control software performed in one cycle of the regular communication. Therefore, the control software can be smoothly transmitted to the second device while restriction on normal communication other than the regular communication is curbed.

In the hot water supply device according to the present aspect, the second device may be configured to include a control unit and a storage unit and temporarily store the control software received from the first device in the storage unit before installing the control software in the control unit.

According to this configuration, the control software can be installed in the control unit of the second device at a predetermined timing.

A second aspect of the present invention relates to a hot water supply system. The hot water supply system according to this aspect includes the hot water supply device according to the first aspect described above and the external device.

According to the hot water supply system according to the present aspect, the same effects as those of the first aspect described above can be achieved.

In the hot water supply system according to the present aspect, the external device may be a server for remotely controlling the hot water supply device via a mobile terminal device.

According to this configuration, since downloading of the control software is performed by the server for managing the remote control, the system configuration and download processing can be simplified compared to a case in which an external device for downloading the control software is separately disposed.

Advantageous Effects of Invention

As described above, according to the present invention, a hot water supply device and a hot water supply system capable of smoothly transmitting control software to each device constituting the hot water supply device while restriction on normal communication in the hot water supply device is curbed can be provided.

The effects and significance of the present invention will become more apparent by description of embodiments to be described below. However, the embodiment described below is merely one example when the present invention is implemented, and the present invention is not limited to that described in the following embodiment.

BRIEF DESCRIPTION OF DRAWINGS

In FIG. 4, (b) of FIG. 4 is a flowchart showing reception processing of control software executed in a control unit of a water heater according to the embodiment.

However, the drawings are for illustration purposes only and do not limit the scope of this invention.

DESCRIPTION OF EMBODIMENTS

Hereinafter, embodiments of the present invention will be described with reference to the drawings.

Figure 1:
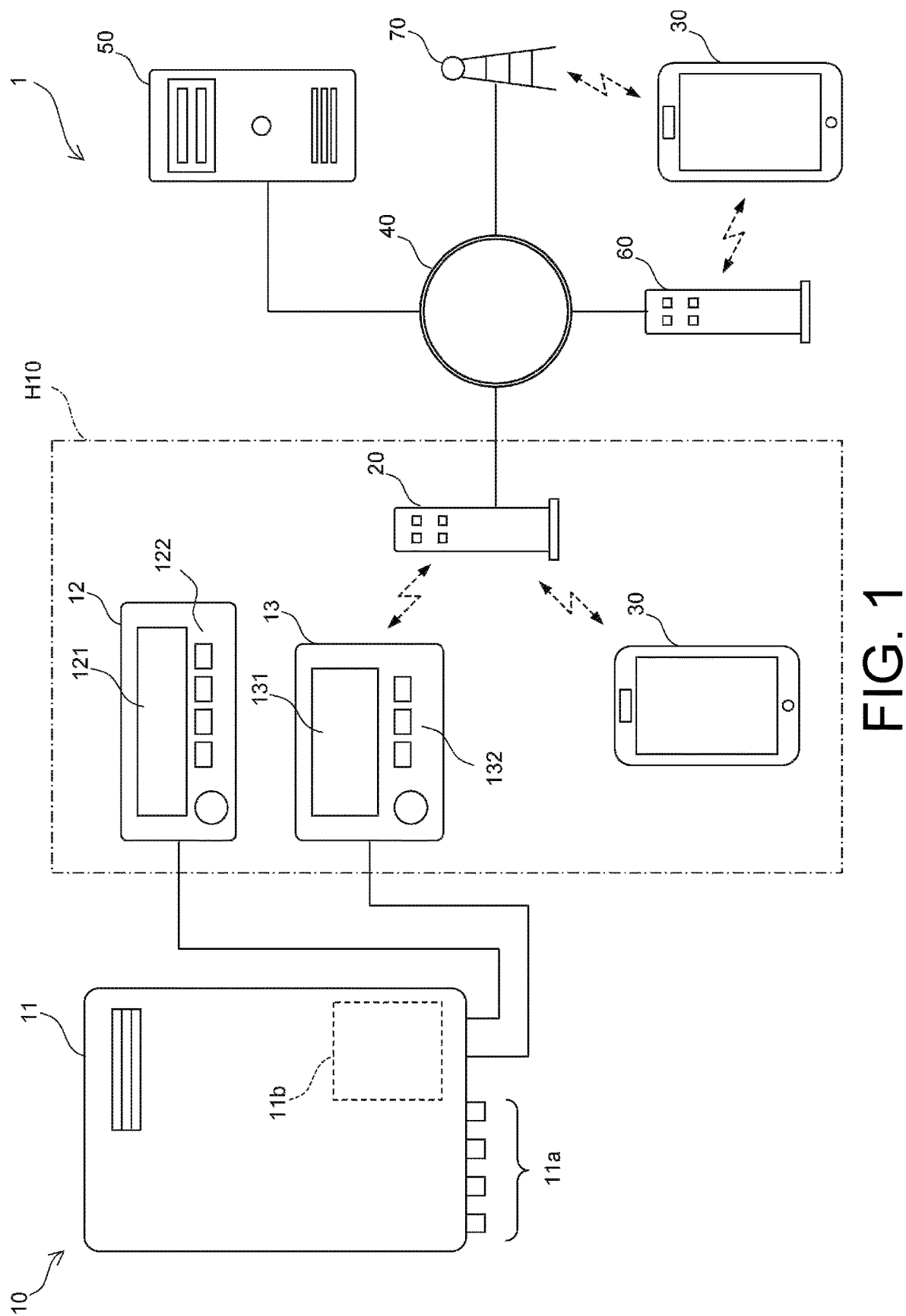
FIG. 1 is a view illustrating a configuration of a hot water supply system according to an embodiment.

FIG. 1 is a view illustrating a configuration of a hot water supply system 1 according to an embodiment.

As illustrated in FIG. 1, the hot water supply system 1 includes a hot water supply device 10, a router 20, a mobile terminal device 30, an external communication network 40, and a server 50.

The hot water supply device 10 includes a water heater 11, and remote controllers 12 and 13. The water heater 11 is a gas water heater that supplies hot water using gas as fuel. Hot water generated by the water heater 11 is supplied to a tap of a kitchen, a bathtub, a faucet, or the like through pipes each connected to the hot water supply port 11a. When the water heater 11 has a floor heating function, a bathroom heating function, and a heating function using a panel heater, hot water is supplied from the water heater 11 to devices that realize these functions.

A circuit board 11b is installed inside the water heater 11, and a circuit section for driving and controlling the water heater 11 is installed on the circuit board 11b. For example, the circuit section controls a suction fan that supplies air to a combustor or controls a solenoid valve for regulating an amount of gas supplied to the combustor.

The remote controllers 12 and 13 are connected to the water heater 11 and are used to make various settings for each function of the hot water supply device 10. The remote controllers 12 and 13 include display units 121 and 131 and input units 122 and 132, respectively. An operator can make an arbitrary setting for hot water filling, hot water supply temperature regulation, or the like by operating the input units 122 and 132 according to screens displayed on the display units 121 and 131. The remote controller 12 is installed in a bathroom, and the remote controller 13 is installed in a kitchen or the like.

Hereinafter, the remote controller 12 installed in a bathroom will be referred to as a "bathroom remote controller 12," and the remote controller 13 installed in a kitchen or the like will be referred to as a "kitchen remote controller 13."

The router 20 is a wireless router for connecting each device present in a building (here, house H10) to the server 50 via the external communication network 40. The router 20 is a communication repeater for connecting devices in the house H10 to the external communication network 40.

The kitchen remote controller 13 is connected to the router 20 by wireless communication. Also, when the mobile terminal device 30 is in the house H10, the mobile terminal device 30 can be connected to the router 20 by wireless communication to communicate with the server 50. The mobile terminal device 30 may be, for example, a mobile phone. In addition, the mobile terminal device 30 may be other portable terminal devices such as a portable tablet terminal. The external communication network 40 may be, for example, the Internet.

The server 50 for managing remote control (remote operation and remote monitoring) of the hot water supply device 10 is connected to the external communication network 40. The kitchen remote controller 13 communicates with the server 50 via the router 20 and the external communication network 40. When the mobile terminal device 30 is in the house H10, the mobile terminal device 30 communicates with the server 50 via the router 20 and the external communication network 40. Also, when the mobile terminal device 30 is outside the house, the mobile terminal device 30 is connected to the external communication network 40 via a router 60 or a base station 70 installed outside to communicate with the server 50.

An application program of the hot water supply system 1 has been downloaded from the server 50 and installed in the kitchen remote controller 13 and the mobile terminal device 30. This application program contains address information (for example, an IP address) for accessing the server 50. The kitchen remote controller 13 and the mobile terminal device 30 access the server 50 on the basis of the address information to perform communication.

The address information of the kitchen remote controller 13 is transmitted to and held by the server 50 at the time of initial setting. Simultaneously at this time, ID information of the kitchen remote controller 13 is transmitted from the kitchen remote controller 13 to the server 50. As the address information of the kitchen remote controller 13, for example, a media access control (MAC) address held in a wireless communication unit 136 (see FIG. 2) of the kitchen remote controller 13 may be used. As the address information of the kitchen remote controller 13, a global IP address of the wireless communication unit 136 of the kitchen remote controller 13 may be used. As the ID information of the kitchen remote controller 13, for example, THING of the wireless communication unit 136 of the kitchen remote controller 13 may be used.

In the configuration of FIG. 1, the operator can perform remote control (remote operation and remote monitoring) of the hot water supply device 10 using the mobile terminal device 30 both inside the house H10 and outside the house.

That is, regardless of whether the mobile terminal device 30 is inside the house H10 or outside the house, a setting request input from the operator to the mobile terminal device 30 is temporarily transmitted to the server 50 via the external communication network 40. When this is received, the server 50 transmits the received setting request to the hot water supply device 10 that has been previously associated with the mobile terminal device 30 from which the setting request is received. Thereby, the setting request is transmitted to the kitchen remote controller 13 of the corresponding hot water supply device 10 via the external communication network 40 and the router 20. In this way, the setting of the content requested by the operator is applied to the hot water supply device 10 by remote operation.

Also, state information of the hot water supply device 10 is transmitted from the kitchen remote controller 13 to the server 50 via the router 20 frequently in a predetermined cycle. The state information is information indicating a current setting state or operating state of the hot water supply device 10. The server 50 manages the received state information for each hot water supply device 10. A browsing request of remote monitoring input from the operator to the mobile terminal device 30 is temporarily transmitted to the server 50 via the external communication network 40. When this is received, the server 50 transmits the mobile terminal device 30 state information of the hot water supply device 10 designated by the browsing request among the hot water supply devices 10 that have been previously associated with the mobile terminal device 30 from which the browsing request is requested. Thereby, the state of the hot water supply device 10 is output in the mobile terminal device 30. In this way, the operator can ascertain a state of the hot water supply device 10 both inside the house H10 and outside the house.

Figure 2:
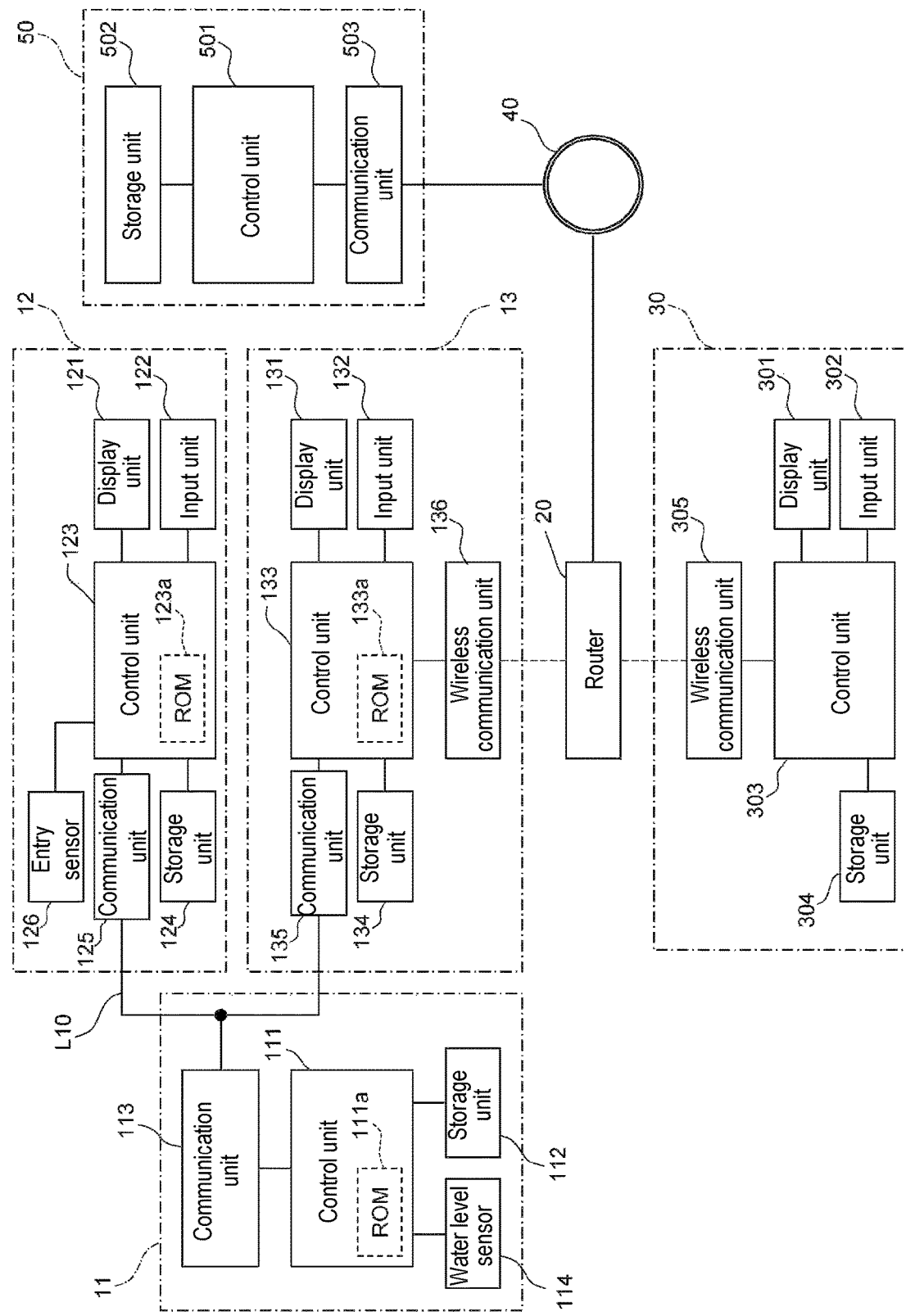
FIG. 2 is a diagram showing circuit blocks of devices constituting the hot water supply system according to the embodiment.

FIG. 2 is a diagram showing circuit blocks of devices constituting the hot water supply system 1.

The water heater 11 includes a control unit 111, a storage unit 112, a communication unit 113, and a water level sensor 114. The control unit 111, the storage unit 112, and the communication unit 113 are included in the circuit section installed on the circuit board 11b described above.

The control unit 111 includes a microcomputer and controls each unit in the water heater 11 according to control software (firmware) stored in a flash read only memory (ROM) 111a. The storage unit 112 includes a memory such as a serial flash memory and temporarily stores data of various types. As will be described later, the storage unit 112 is used to temporarily store the control software.

The communication unit 113 communicates with the bathroom remote controller 12 and the kitchen remote controller 13 according to control from the control unit 111. The communication unit 113 is connected to a communication unit 125 of the bathroom remote controller 12 and a communication unit 135 of the kitchen remote controller 13 by a two-core communication line L10.

The water level sensor 114 detects a water level of a bathtub to which the hot water supply device 10 is connected. The water level sensor 114 may detect a water level of the bathtub by, for example, a water pressure in a pipe connected to the bathtub. The control unit 111 detects that a person has entered and exited the bathtub by a change in the water level detected by the water level sensor 114. The control unit 111 frequently transmits the detection results to the kitchen remote controller 13. In addition, various sensors such as a combustion sensor, a hot water amount sensor, and the like are disposed in the water heater 11.

The bathroom remote controller 12 includes a control unit 123, a storage unit 124, the communication unit 125, and an entry sensor 126 in addition to the display unit 121 and the input unit 122 described above. The display unit 121 may be configured by, for example, a liquid crystal panel. The input unit 122 includes operation buttons of various types such as a temperature setting button. The display unit 121 may be a touch panel.

The control unit 123 includes a microcomputer and performs predetermined control according to control software (firmware) stored in a flash ROM 123a. The storage unit 124 includes a memory such as a serial flash memory and temporarily stores data of various types. As will be described later, the storage unit 124 is used to temporarily store the control software.

The communication unit 125 communicates with the water heater 11 according to control from the control unit 123. The communication unit 125 is connected to the communication unit 113 of the water heater 11 and the communication unit 135 of the kitchen remote controller 13 by the two-core communication line L10.

The entry sensor 126 detects entering and exiting of a person with respect to the bathroom. The entry sensor 126 may be, for example, a human detecting sensor using infrared rays. The control unit 123 detects that a person has entered the bathroom on the basis of an output of the entry sensor 126. The control unit 123 frequently transmits the detection result to the kitchen remote controller 13.

The kitchen remote controller 13 includes a control unit 133, a storage unit 134, and the communication unit 135 in addition to the display unit 131 and the input unit 132 described above. The display unit 131 may be configured by, for example, a liquid crystal panel. The input unit 132 includes operation buttons of various types. The display unit 131 may be a touch panel.

The control unit 133 includes a microcomputer and performs predetermined control according to control software (firmware) stored in a flash ROM 133a. The storage unit 134 includes a memory such as a serial flash memory and temporarily stores data of various types. As will be described later, the storage unit 134 is used to temporarily store the control software.

The communication unit 135 communicates with the water heater 11 according to control from the control unit 133. The communication unit 135 is connected to the communication unit 113 of the water heater 11 and the communication unit 125 of the bathroom remote controller 12 by the two-core communication line L10.

Further, the kitchen remote controller 13 includes the wireless communication unit 136. Here, the wireless communication unit 136 is a wireless communication module capable of wireless communication with the router 20. An IP address for identifying a device on a local area network (LAN) set in the house H10 is assigned to the wireless communication unit 136 (wireless communication module). Also, the wireless communication unit 136 holds the above-described MAC address. In addition, the kitchen remote controller 13 includes a speaker for outputting sound.

The mobile terminal device 30 includes a display unit 301, an input unit 302, a control unit 303, a storage unit 304, and a wireless communication unit 305. The display unit 301 may be configured by, for example, a liquid crystal panel. The input unit 302 includes operation buttons of various types and a touch panel laminated on the display unit 301.

The control unit 303 includes a central processing unit (CPU) and performs predetermined control according to a program stored in the storage unit 304. The storage unit 304 includes a memory and stores a predetermined control program. The wireless communication unit 305 communicates with the router 20 according to control from the control unit 303. The wireless communication unit 305 is a wireless communication module capable of wireless communication with the router 20. An IP address is also assigned to the wireless communication unit 305. Also, the wireless communication unit 305 holds the above-described MAC address. In addition, the mobile terminal device 30 includes a speaker for outputting sound.

The server 50 includes a control unit 501, a storage unit 502, and a communication unit 503. The control unit 501 includes a CPU and performs predetermined control according to a program stored in the storage unit 502. The storage unit 502 includes a memory and a hard disk and stores a predetermined control program and database. The communication unit 503 performs predetermined communication according to control from the control unit 501.

In the present embodiment, the mobile terminal device 30 that can perform remote control (remote operation and remote monitoring) of the hot water supply device 10 is registered in the server 50 in advance in association with the hot water supply device 10. That is, the hot water supply device 10 and the mobile terminal device 30 are paired in advance, and information indicating the pairing (pairing information) is managed in the server 50.

In the present embodiment, this pairing is performed in a building in which the hot water supply device 10 is installed. That is, in principle, the owner of the mobile terminal device 30 cannot pair his/her own mobile terminal device 30 with the hot water supply device 10 unless he/she enters the building in which the hot water supply device 10 is installed with the mobile terminal device 30. Thereby, a likelihood that the mobile terminal device 30 and the hot water supply device 10 will be improperly paired by a malicious third party is reduced. Therefore, a risk in which the remote control (remote control and remote monitoring) is improperly performed can be reduced.

Figure 3:
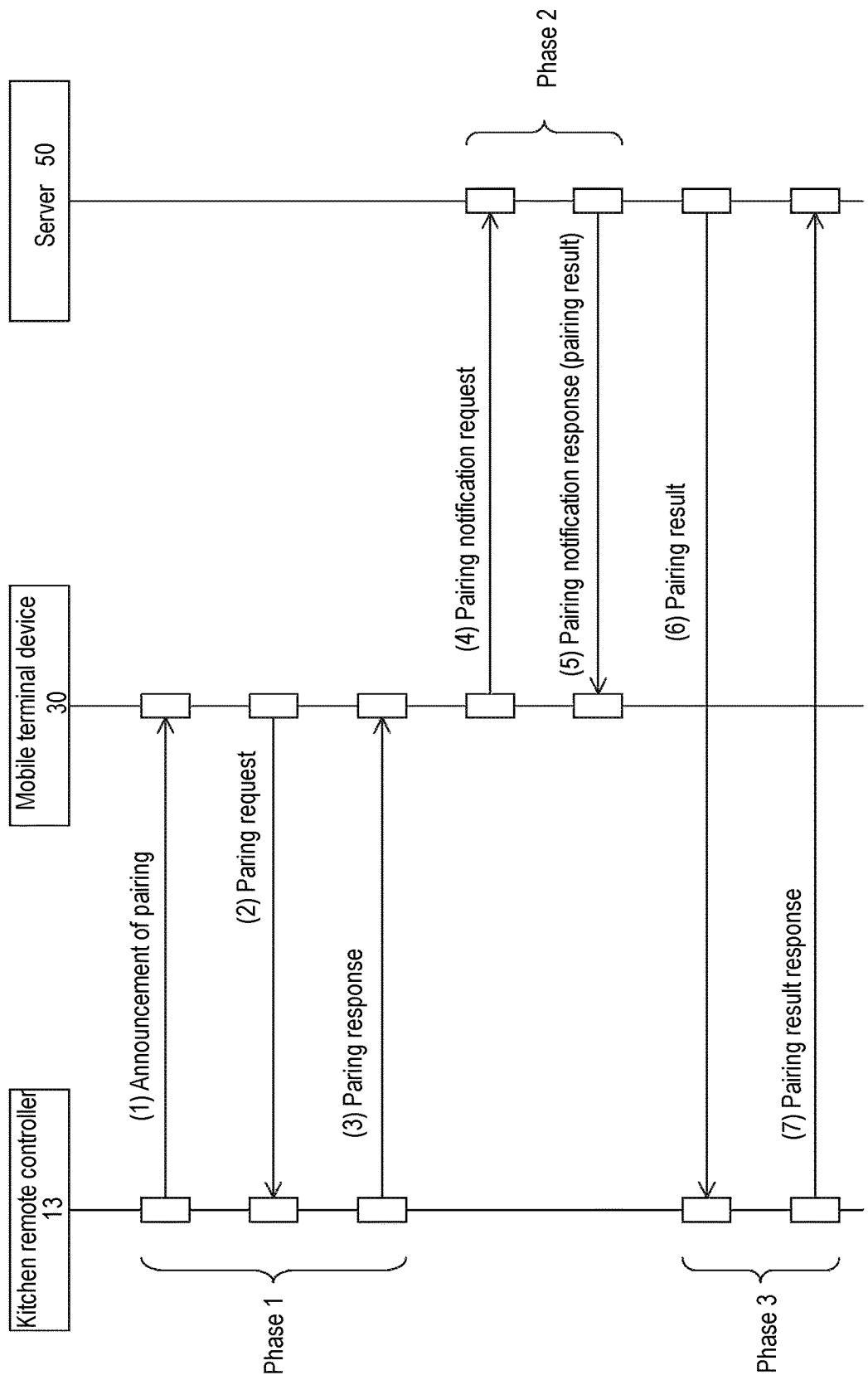
FIG. 3 is a sequence diagram showing a flow of information transmission/reception performed between each device when a hot water supply device and a mobile terminal device according to the embodiment are paired.

FIG. 3 is a sequence diagram showing a flow of information transmission/reception performed between the kitchen remote controller 13, the mobile terminal device 30, and the server 50 when the hot water supply device 10 and the mobile terminal device 30 are paired.

When an operation for pairing is performed on the kitchen remote controller 13, an announcement for pairing is transmitted to be broadcast from the kitchen remote controller 13 in sequence (1). When this announcement is received by the mobile terminal device 30, a pairing request is transmitted from the mobile terminal device 30 to the kitchen remote controller 13 in sequence (2). When this pairing request is received by the kitchen remote controller 13, a pairing response is transmitted from the kitchen remote controller 13 to the mobile terminal device 30 in sequence (3). At this time, ID information (for example, THING) of the kitchen remote controller 13 is passed from the kitchen remote controller 13 to the mobile terminal device 30. Thereby, a procedure for pairing performed between the kitchen remote controller 13 and the mobile terminal device 30 ends (phase 1).

Next, a pairing notification request for requesting pairing registration is transmitted from the mobile terminal device 30 to the server 50 in sequence (4). The pairing notification request includes ID information (for example, THING) of the kitchen remote controller 13, and ID information and address information of the mobile terminal device 30. As the ID information of the mobile terminal device 30, for example, a universally unique identifier (UUID) or a globally unique identifier (GUID) of the wireless communication unit 305 may be used. Also, for example, a MAC address may be used as the address information of the mobile terminal device 30.

When the pairing notification request is received by the server 50, the ID information (THING of the wireless communication unit 136) of the kitchen remote controller 13 is associated with the ID information (UUID/GUID of the wireless communication unit 305) and the address information (MAC address) of the mobile terminal device 30 to be registered in the database in the server 50. Thereby, the hot water supply device 10 and the mobile terminal device 30 are associated (paired).

When registration of the pairing ends in this way, a pairing notification response (pairing result) is transmitted from the server 50 to the mobile terminal device 30 in sequence (5). Thereby, it is ascertained that the pairing has been properly performed in the mobile terminal device 30. In this way, a procedure performed between the server 50 and the mobile terminal device 30 ends (phase 2).

Further, a notification of the pairing result indicating that the pairing has been registered is transmitted from the server 50 to the kitchen remote controller 13 in sequence (6). When this notification is received by the kitchen remote controller 13, it is ascertained in the kitchen remote controller 13 that the pairing has been properly performed on the basis of the pairing result as described above, and, in sequence (7), a pairing result response is transmitted from the kitchen remote controller 13 to the server 50. In this way, a procedure performed between the server 50 and the kitchen remote controller 13 ends (phase 3). Thereby, the entire sequence for pairing ends.

When the pairing information is registered in the server 50 as described above, the mobile terminal device 30 capable of remotely controlling the hot water supply device 10 is limited to the mobile terminal device 30 identified by the ID information of the pairing information. Thereby, security of the user for the hot water supply device 10 is ensured.

Incidentally, in the hot water supply system 1, control software may be installed on the control units 111, 123, and 133 (microcomputers). For example, when an operational problem occurs in the control software, control software for improving the problem is installed in the control units 111, 123, and 133 (microcomputers).

In this case, the control software can be smoothly installed on the control unit 133 of the kitchen remote controller 13 that can be connected to the external communication network 40. On the other hand, the water heater 11 and the bathroom remote controller 12 that are not connected to the external communication network 40 need to acquire the control software via the kitchen remote controller 13 that can be connected to the external communication network 40.

For example, the control software of the control unit 111 of the water heater 11 or the control unit 123 of the bathroom remote controller 12 is acquired by the kitchen remote controller 13 that can be connected to the external communication network 40, and the acquired control software is transmitted from the kitchen remote controller 13 to the water heater 11 or the bathroom remote controller 12. However, in this configuration, while the control software is being transmitted from the kitchen remote controller 13, the two-core communication line L10 is occupied by the communication, and thereby normal communication in the hot water supply device 10 is restricted. Therefore, a problem may occur in an operation of the hot water supply device 10.

Particularly when a communication speed through the two-core communication line L10 (for example, communication speed of analog communication by sine waves) is slow and a capacity of the control software is large, normal communication (for example, transmission of the above-described state information or the like) of the hot water supply device 10 will not be performed for a long period of time. Thereby, there is a likelihood that remote control using the bathroom remote controller 12 and the kitchen remote controller 13 or remote control using the mobile terminal device 30 will not be properly performed.

Therefore, in the present embodiment, a configuration for smoothly transmitting control software to each device constituting the hot water supply device 10 while restriction on normal communication in the hot water supply device 10 is curbed is provided. This configuration will be described below.

Figure 4:
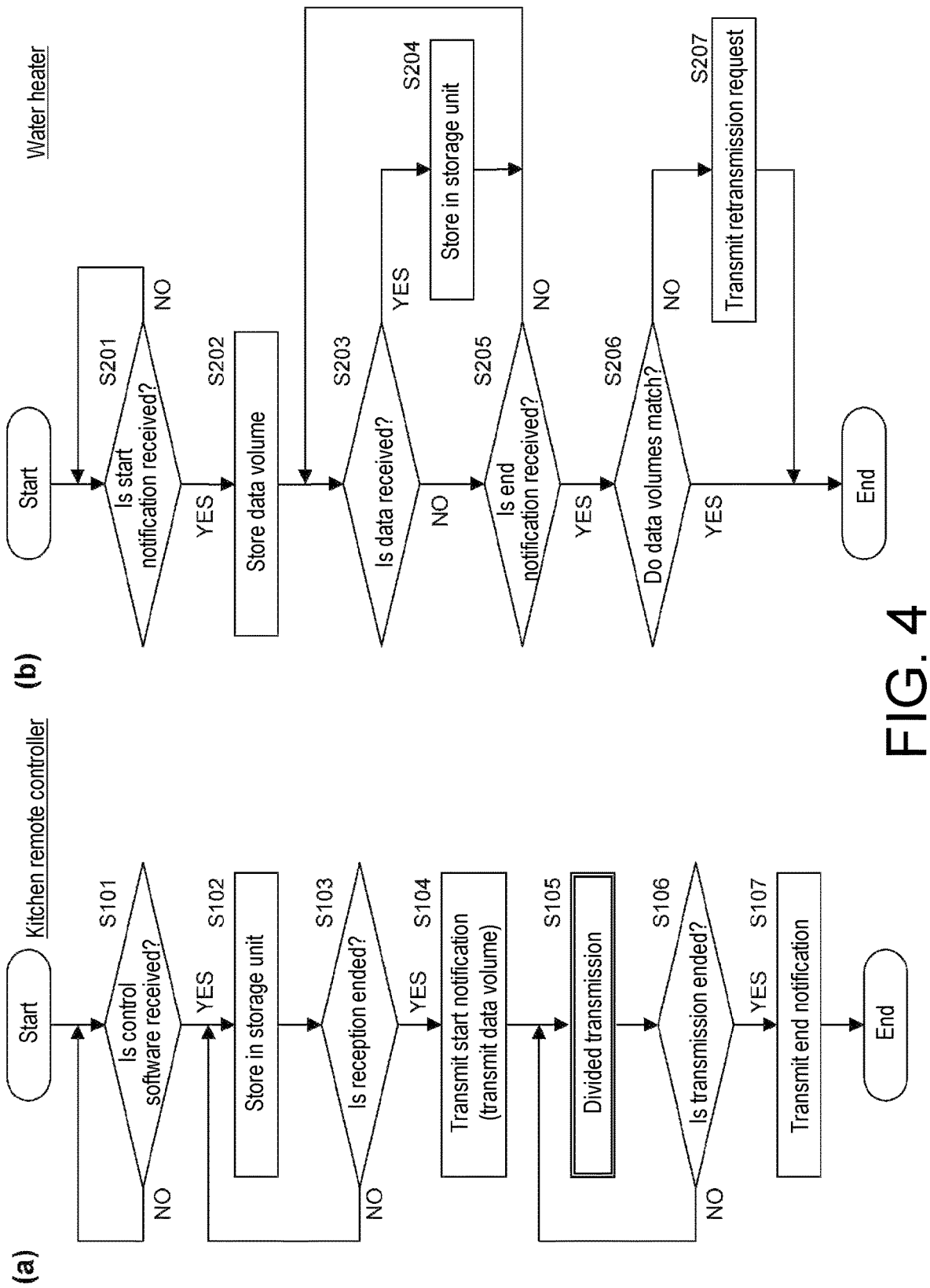
In FIG. 4, (a) of FIG. 4 is a flowchart showing transmission processing of control software executed in a control unit of a kitchen remote controller according to the embodiment.

In FIG. 4, (a) of FIG. 4 is a flowchart showing transmission processing of control software executed in the control unit 133 of the kitchen remote controller 13.

For example, when control software set in the control unit 111 of the water heater 11 is updated, control software to be updated is transmitted from the server 50 to the kitchen remote controller 13 at a predetermined timing together with information indicating a device to be updated (here, the water heater 11).

When the control unit 133 of the kitchen remote controller 13 receives control software from the server 50 (S101: YES), the control unit 133 sequentially stores the received control software in the storage unit 134 (S102). The control unit 133 continues to store the control software in the storage unit 134 (S102) until all the control software is completely received (S103: NO).

When all the control software is received in this way (S103: YES), the control unit 133 transmits a start notification indicating that transmission of the control software is started to a device (here, the water heater 11) on which the control software should be installed (S104). The start notification contains a data volume of the control software.

Thereafter, the control unit 133 divides data of the control software into a plurality of pieces and transmits them to a transmission destination device (the water heater 11) for each separate unit (S105). This transmission is performed via the above-described two-core communication line L10. When normal transmission processing such as transmission of state information occurs at the time of transmitting one separate unit, the normal transmission processing is performed after the transmission of one separate unit ends. Also, transmission of the next separate unit is performed after the normal transmission processing.

When all the control software is transmitted in this way (S106: YES), the control unit 133 transmits an end notification indicating that transmission of the control software has ended to the target device (water heater 11) (S107). Thereby, the transmission processing ends by the control unit 133.

Further, the data volume of the control software may be contained in the end notification transmitted in step S107 instead of the start notification transmitted in step S104.

In FIG. 4, (b) of FIG. 4 is a flowchart showing reception processing of the control software executed in the control unit 111 of the water heater 11.

When the start notification transmitted in step S104 of (a) of FIG. 4 is received (S201: YES), the control unit 111 of the water heater 11 stores the data volume of the control software contained in the start notification in the storage unit 112 (S202). Thereafter, when the separate units of the control software transmitted in step S105 of (a) of FIG. 4 are received (S203: YES), the control unit 111 stores the received separate units sequentially in the storage unit 112 (S204). The control unit 111 continues to store the separate units of the control software in the storage unit 112 (S204) until the end notification transmitted in step S104 of (a) of FIG. 4 is received (S203: NO, S205: NO).

When the end notification is received from the kitchen remote controller 13 (S205: YES), the control unit 111 determines whether or not the data volume of the control software stored in the storage unit 112 matches the data volume stored in step S202 (S206). When these two data capacities match (S206: YES), the control unit 111 ends the processing on the assumption that the control software have been properly received.

On the other hand, when these two data capacities do not match (S206: NO), the control unit 111 assumes that the control software have not been properly received, transmits a retransmission request for the control software to the kitchen remote controller 13 (S207), and ends the processing. In this case, the control unit 111 erases the control software stored in the storage unit 112 and waits for the control software to be transmitted again from the kitchen remote controller 13. Also, when the retransmission request (S207) is received from the water heater 11, the control unit 133 of the kitchen remote controller 13 performs the processing of steps S104 to S107 of (a) of FIG. 4 again and transmits the control software to the water heater 11 again. When this is received, the control unit 111 of the water heater 11 executes the processing of (b) of FIG. 4 again.

In this way, when the data of the control software is properly held in the storage unit 112, the control unit 111 writes the data of the control software held in the storage unit 112 to its own flash ROM 111a at a predetermined timing. Thereby, installation of the control software is completed.

Further, when a transmission destination of the control software is the bathroom remote controller 12, the control unit 133 of the kitchen remote controller 13 executes the processing of steps S104 to S107 of (a) of FIG. 4 for the bathroom remote controller 12. In this case, the same processing as in (b) of FIG. 4 is performed in the control unit 123 of the bathroom remote controller 12, and the data of the control software is stored in the storage unit 124 of the bathroom remote controller 12. Also in this case, the control unit 123 of the bathroom remote controller 12 writes the data of the control software held in the storage unit 124 to its own flash ROM 123a at a predetermined timing. Thereby, installation of the control software is completed.

Also, when a setting destination of the control software is the kitchen remote controller 13, the control unit 133 of the kitchen remote controller 13 writes the data of the control software stored in the storage unit 134 in step S102 to the flash ROM 133a of the kitchen remote controller 13 at a predetermined timing. Thereby, installation of the control software is completed.

Figure 5:
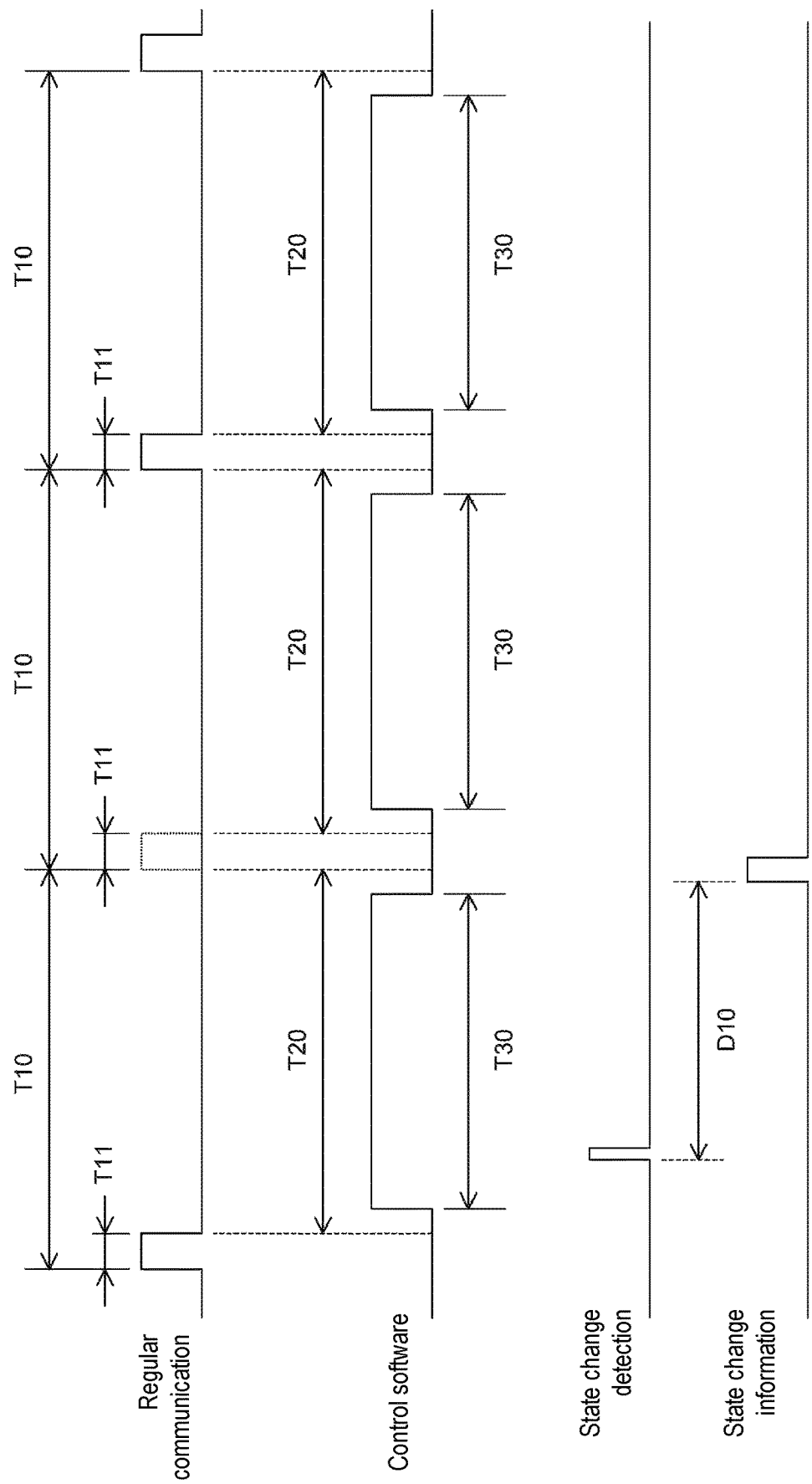
FIG. 5 is a timing chart schematically showing an example of a divided transmission processing of the control software according to the embodiment.

FIG. 5 is a timing chart schematically showing an example of the divided transmission processing of the control software performed in step S105 of (a) of FIG. 4.

An uppermost row of FIG. 5 shows timing of regular communication performed between the water heater 11, and the bathroom remote controller 12 and the kitchen remote controller 13. In this regular communication, for example, state information of the water heater 11 may be transmitted from the water heater 11 to the bathroom remote controller 12 and the kitchen remote controller 13 via the two-core communication line L10. The regular communication is performed at a regular cycle T10. The cycle T10 may be, for example, 5 seconds. Also, information (state information) is transmitted during time T11 at the time of regular communication. The time T11 is considerably short compared to the cycle T10.

A second row from above in FIG. 5 shows transmission timing of the control software. In this example, data of the control software is divided so that a transmission time T30 for a separate unit of the data of the control software is shorter than the cycle T10 of the regular communication. More specifically, the data of the control software is divided into each separate unit and transmitted so that the transmission time T30 of the separate unit falls within a spare time T20 of the regular communication.

A third row from above in FIG. 5 shows a timing at which a change in a state of the hot water supply device 10 is detected. Here, "change in a state" may indicate, for example, that an operation switch of the kitchen remote controller 13 has been pressed, settings of various types have been changed, or a flame based on combustion of a combustor has been detected in the water heater 11. When a change in the state occurs, state change information indicating contents of the change is passed between the water heater 11, and the bathroom remote controller 12 and the kitchen remote controller 13 via the two-core communication line L10. A lowermost row of FIG. 5 shows a transmission timing of the state change information.

In the example of FIG. 5, since the transmission time T30 of the separate unit is set to fall within the spare time T20 of the regular communication, each separate unit is basically transmitted in the spare time T20 of the regular communication. Therefore, the regular communication being canceled by the transmission of the control software does not easily occur. Also, when a state change is detected during the transmission time T30, transmission of the state change information is delayed only by the transmission time of the separate unit of the control software at the longest. For example, in the example of FIG. 5, the state change information is transmitted at a timing at which a delay time D10 has elapsed after the state change was detected. In this example, since the transmission time of the state change information overlaps a second transmission timing from the left in the regular communication, the regular communication at this transmission timing is cancelled.

Figure 6:
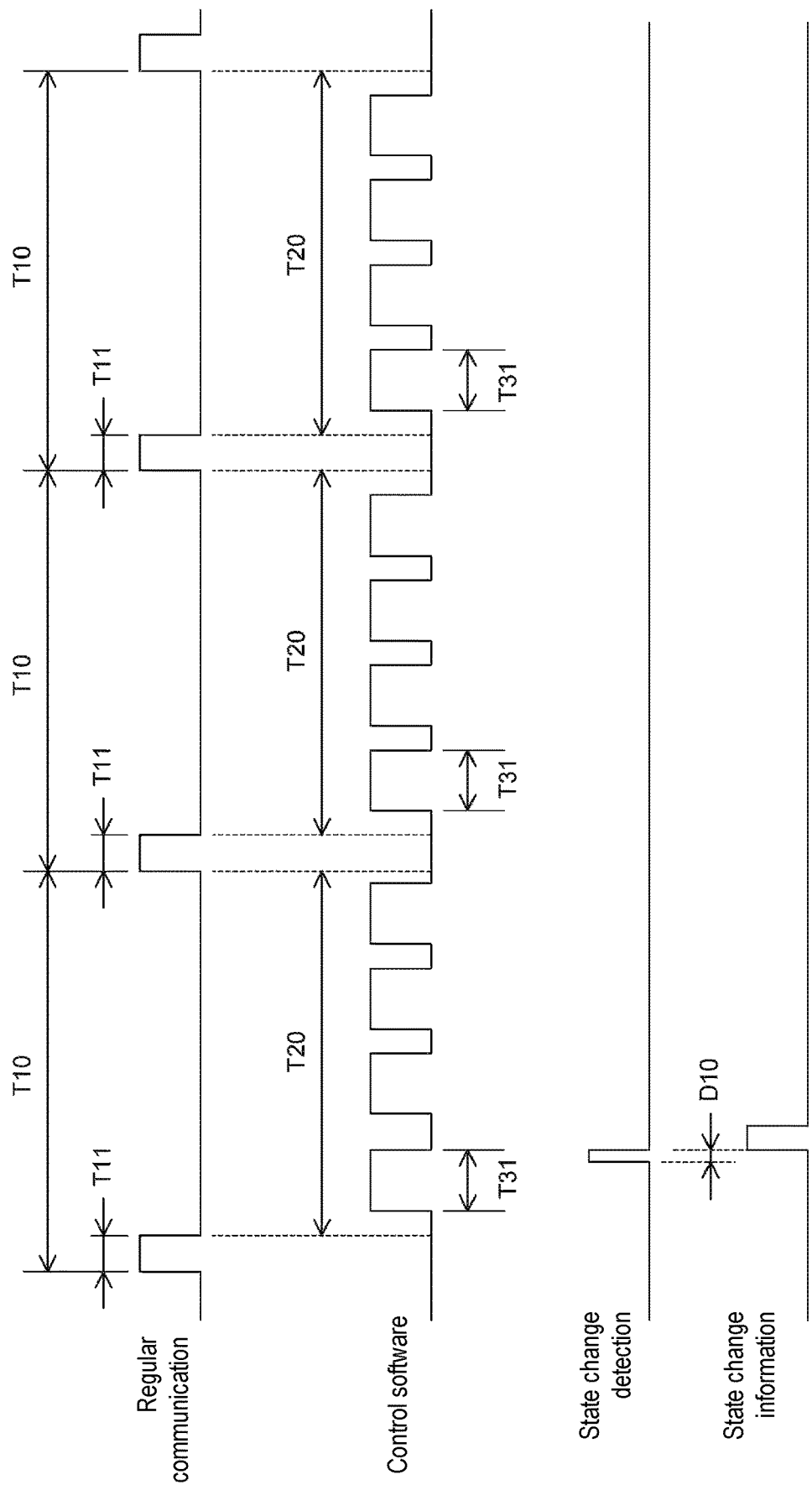
FIG. 6 is a timing chart schematically showing another example of a divided transmission processing of the control software according to the embodiment.

Further, as shown in FIG. 6, data of the control software may be divided so that a separate unit of the data of the control software is transmitted a plurality of times in one cycle of the regular communication. Thereby, the delay time D10 can be further shortened. In the example of FIG. 6, the data of the control software is divided so that the separate unit is transmitted four times in the spare time T20 of the regular communication. Accordingly, a transmission time T31 for one separate unit is shorter than one fourth of that in the case of FIG. 5. Further, the number of times of separate units transmitted in the spare time T20 of the regular communication is not necessarily limited to four times and may be a plurality of other times.

Further, a data volume of the separate unit can be calculated from a relationship between the transmission time T30 or T31 and a transmission rate of data on the two-core communication line L10. The data volume of the separate unit in the example of FIG. 6 is small compared to that in the example of FIG. 5. Therefore, a time required to transmit all the control software is shorter in the example of FIG. 5 than that in the example of FIG. 6. Therefore, in order to transmit the control software more quickly, it can be said that the division method of FIG. 5 is preferable to the division method of FIG. 6.

Effects of Embodiment

According to the present embodiment, the following effects can be achieved.

Data of control software downloaded to the kitchen remote controller 13 (first device) is divided into a plurality of pieces and transmitted to the water heater 11 or the bathroom remote controller 12 (second device). Therefore, a period during which normal communication (regular communication, transmission of state change information, or the like) is restricted becomes shorter than when data of the control software is collectively transmitted. That is, normal communication is only restricted in a period during which a separate unit of the data of the control software is transmitted. Therefore, the control software can be smoothly transmitted to the water heater 11 or the bathroom remote controller 12 (the second device) while restriction on the normal communication in the hot water supply device 10 is curbed.

As shown in FIGS. 5 and 6, the kitchen remote controller 13 (the first device) divides data of the control software so that the transmission time T30 of the separate unit of the data of the control software is shorter than the cycle T10 of the regular communication. Thereby, the control software can be smoothly transmitted from the kitchen remote controller 13 (the first device) to the water heater 11 or the bathroom remote controller 12 (the second device) without hindering the regular communication.

In the example of FIG. 6, the kitchen remote controller 13 (the first device) divides data of the control software so that the separate unit of the data of the control software can be transmitted a plurality of times in one cycle of the regular communication. Thereby, a period during which normal communication other than regular communication (for example, transmission of state change information) is restricted can be further shortened. Therefore, the control software can be smoothly transmitted to the water heater 11 or the bathroom remote controller 12 (the second device) while restriction on the normal communication other than the regular communication is curbed.

In step S204 of (b) of FIG. 4, the water heater 11 or the bathroom remote controller 12 (the second device) stores the control software received from the kitchen remote controller 13 (the first device) temporarily in the storage units 112 and 124 before installing the control software in the control units 111 and 123. Thereby, the control software can be installed on the control units 111 and 123 of the water heater 11 or the bathroom remote controller 12 (the second device) at a predetermined timing.

Modified Example

In the above-described embodiment, the kitchen remote controller 13 can be connected to the external communication network 40, but the water heater 11 may be connectable to the external communication network 40.

Figure 7:
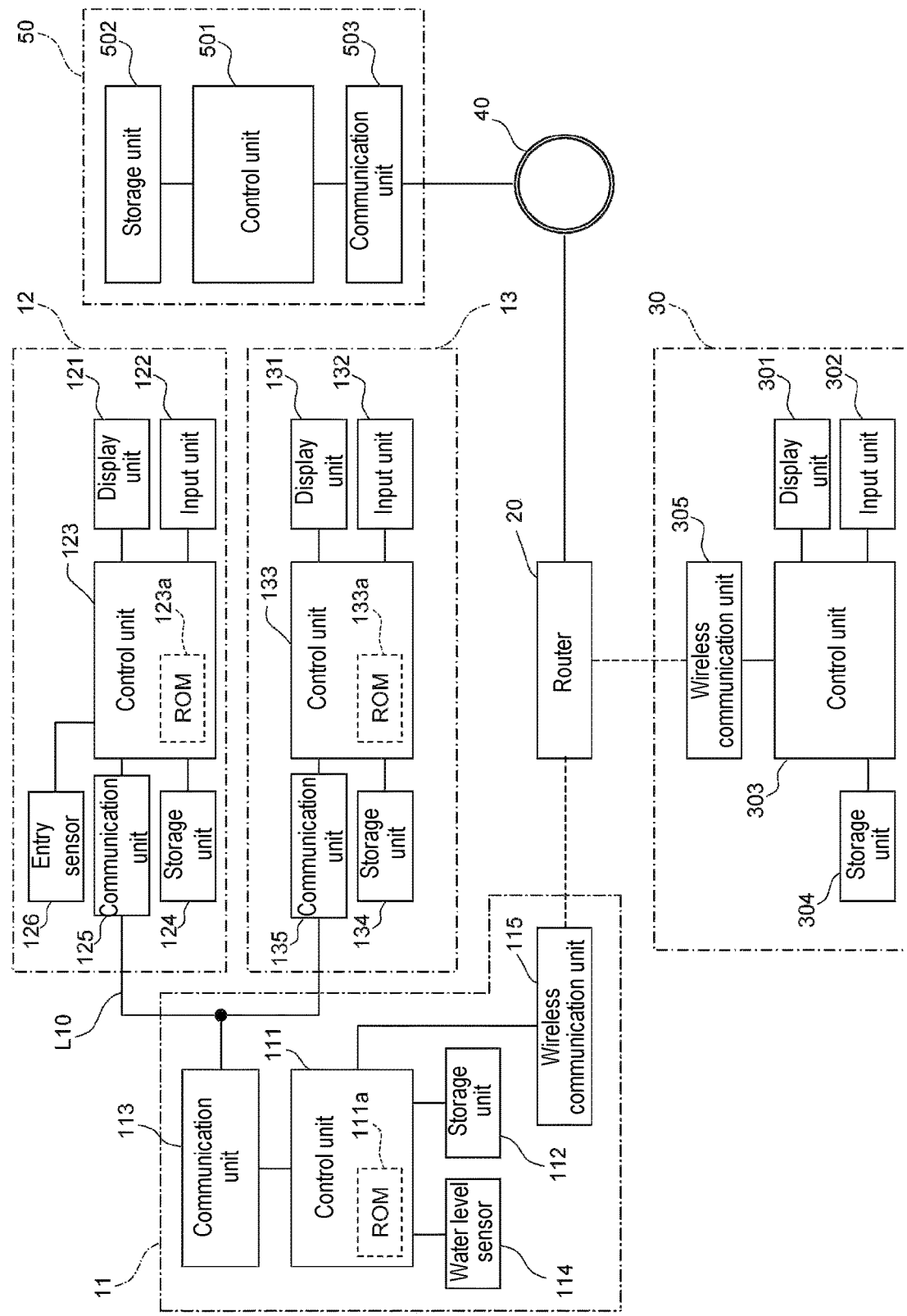
FIG. 7 is a diagram showing circuit blocks of devices constituting a hot water supply system according to a modified example.

FIG. 7 is a diagram showing circuit blocks of devices in this case.

In this configuration example, a wireless communication unit 115 that can be connected to the router 20 is provided in the water heater 11. Control software is downloaded from the server 50 to the water heater 11 via the wireless communication unit 115 and the router 20. In this case, the control unit 111 of the water heater 11 executes the processing of (a) of FIG. 4. Also, the control unit 133 of the kitchen remote controller 13 executes the processing of (b) of FIG. 4 in the same manner as the control unit 123 of the bathroom remote controller 12 to receive its own control software from the water heater 11. Even with this configuration, the same effects as those of the above-described embodiment can be achieved.

Alternatively, a control unit having a wireless communication unit may be disposed in the hot water supply device 10 other than the water heater 11, the bathroom remote controller 12, and the kitchen remote controller 13, and the control unit may be connected to the router 20. In this case, the control by the kitchen remote controller 13 in the above-described embodiment is performed by the control unit.

Also, the control software is downloaded from the server 50 that manages the remote control in the above-described embodiment, but other than the server 50, an external device for downloading the control software may be connected to the external communication network 40, and the control software may be downloaded from the external device to the kitchen remote controller 13. Also, devices on which the control software is installed are not limited to the water heater 11, the bathroom remote controller 12, and the kitchen remote controller 13, and other devices may be further included therein.

Also, a method of dividing the control software is not limited to the methods shown in FIGS. 5 and 6 and other methods of the division may be used as long as the control software is divided into a plurality of pieces and transmitted.

Also, the communication between the kitchen remote controller 13 and the router 20 may be performed by wired communication in the configuration of FIG. 2, and the communication between the water heater 11 and the router 20 may be performed by wired communication in the configuration of FIG. 7.

Also, the configuration of the hot water supply system 1 is not necessarily limited to the configuration illustrated in FIG. 1, and may be, for example, a hot water supply system including a power storage system using a fuel cell. Also, the hot water supply system 1 does not necessarily have to be remotely controllable by the mobile terminal device 30, and may be, for example, a hot water supply system including only the hot water supply device 10 and an external device for downloading control software.

Further, a stationary terminal device that is not portable and is installed at a predetermined place may be included in the terminal device for remotely controlling the hot water supply device 10. The present invention may also be applied to a hot water supply system that cannot be remotely controlled by a mobile terminal device.

In addition, in the embodiment of the present invention, various changes can be made as appropriate within the scope of the claims.

The invention claimed is:

1. A hot water supply device comprising:
    a water heater and a remote controller;
    a first device performing control related to hot water supply;
    a second device connected to be able to communicate with the first device and performing control related to hot water supply; and
    a communication unit provided in the first device and able to be connected to an external communication network, wherein
    the first device divides data of control software of the second device acquired from an external device via the communication unit into a plurality of pieces and transmits the divided data to the second device,
    wherein the first device divides the data of the control software so that a transmission time of a separate unit of the data of the control software is shorter than one cycle of regular communication performed between the water heater and the remote controller connected to the water heater.

2. The hot water supply device according to claim 1, wherein
    the first device is one of the water heater and the remote controller for remotely controlling the water heater, and the second device is the other of the water heater and the remote controller.

3. The hot water supply device according to claim 1, wherein
the first device is the remote controller for remotely controlling the water heater, and
the second device is another remote controller for remotely controlling the water heater.

4. The hot water supply device according to claim 1, wherein the first device divides the data of the control software so that the separate unit of the data of the control software is able to be transmitted a plurality of times in one cycle of the regular communication.

5. The hot water supply device according to claim 1, wherein the second device includes a control unit and a storage unit and temporarily stores the control software received from the first device in the storage unit before installing the control software in the control unit.

6. A hot water supply system comprising:
the hot water supply device according to claim 5; and
the external device.

7. The hot water supply system according to claim 6, wherein
the external device is a server for remotely controlling the hot water supply device via a mobile terminal device.

* * * * *